(12) United States Patent
Rauh et al.

(10) Patent No.: US 8,489,288 B2
(45) Date of Patent: Jul. 16, 2013

(54) METHOD AND CONTROL DEVICE FOR THE ACTIVATION OF A PASSENGER SAFETY ARRANGEMENT OF A VEHICLE

(75) Inventors: Christian Rauh, Munich (DE); Jens Becker, Stuttgart (DE); Anders Wogel, Olofstorp (SE); Anders Axelson, Torslanda (SE); Alfons Doerr, Stuttgart (DE); Christian Korn, Stuttgart (DE); Paer Nilsson, Mölndal (SE); Peter Harda, Goeteborg (SE); Stephan Rittler, Urbach (DE); Hansjoerg Markus Hild, Friolzheim (DE); Olaf Koerner, Hamburg (DE)

(73) Assignees: Robert Bosch GmbH, Stuttgart (DE); Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/351,746

(22) Filed: Jan. 17, 2012

(65) Prior Publication Data

US 2012/0256404 A1     Oct. 11, 2012

Related U.S. Application Data

(63) Continuation of application No. 13/151,936, filed on Jun. 2, 2011, now abandoned.

(30) Foreign Application Priority Data

Jun. 9, 2010   (EP) ..................................... 10165318

(51) Int. Cl.
*B60R 21/0132*   (2006.01)

(52) U.S. Cl.
USPC .............................. 701/45; 280/735; 180/282

(58) Field of Classification Search
USPC ........... 701/45, 46, 47, 70; 702/141; 340/436, 340/438, 440; 180/282; 280/735
See application file for complete search history.

(56) References Cited

U.S. PATENT DOCUMENTS

| | | | |
|---|---|---|---|
| 2,834,606 A * | 5/1958 | Bertrand | 280/730.1 |
| 6,433,681 B1 * | 8/2002 | Foo et al. | 340/440 |
| 6,535,800 B2 * | 3/2003 | Wallner | 701/1 |
| 6,542,073 B2 * | 4/2003 | Yeh et al. | 340/440 |
| 6,600,414 B2 * | 7/2003 | Foo et al. | 340/440 |
| 6,654,671 B2 * | 11/2003 | Schubert | 701/1 |
| 6,694,225 B2 * | 2/2004 | Aga et al. | 701/1 |
| 6,694,226 B2 * | 2/2004 | Tobaru et al. | 701/1 |
| 6,714,848 B2 * | 3/2004 | Schubert et al. | 701/46 |
| 7,213,670 B2 * | 5/2007 | Iyoda et al. | 180/282 |
| 7,228,217 B2 * | 6/2007 | Iyoda et al. | 701/70 |
| 7,245,998 B2 * | 7/2007 | Ogata et al. | 701/45 |
| 7,333,883 B2 * | 2/2008 | Geborek et al. | 701/45 |
| 7,403,848 B2 * | 7/2008 | Schubert et al. | 701/70 |
| 2005/0033496 A1 * | 2/2005 | Iyoda et al. | 701/38 |

FOREIGN PATENT DOCUMENTS

| | | |
|---|---|---|
| DE | 101 64 332 | 9/2002 |
| DE | 10 2008 040 043 | 12/2009 |

(Continued)

*Primary Examiner* — Joseph Rocca
(74) *Attorney, Agent, or Firm* — Kenyon & Kenyon LLP

(57) ABSTRACT

A method of activating a passenger safety arrangement of a vehicle, the method including reading in a roll rate of the vehicle and triggering the passenger safety arrangement when, at a first time, at least one roll rate value is present, which exhibits a positive sign and is larger than a roll rate positive threshold value and when, at a second time after the first time, at least one roll rate value is present, which exhibits a negative sign and is smaller than a roll rate negative threshold value.

20 Claims, 3 Drawing Sheets

FOREIGN PATENT DOCUMENTS

| EP | 1 219 500 | 7/2002 |
| EP | 1 312 515 | 5/2003 |
| EP | 1 502 823 | 2/2005 |
| EP | 1 555 165 | 7/2005 |

* cited by examiner

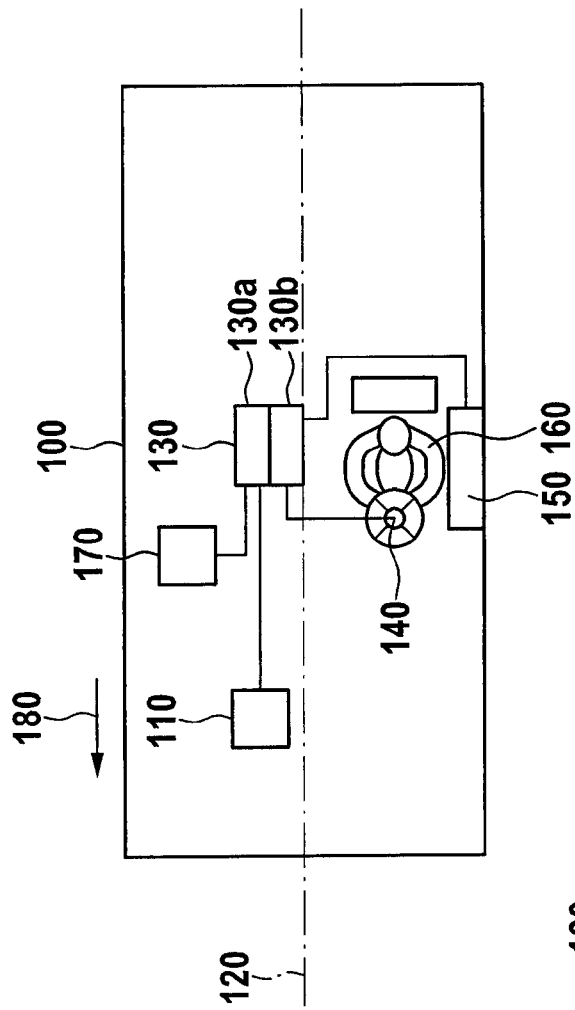
Fig. 1
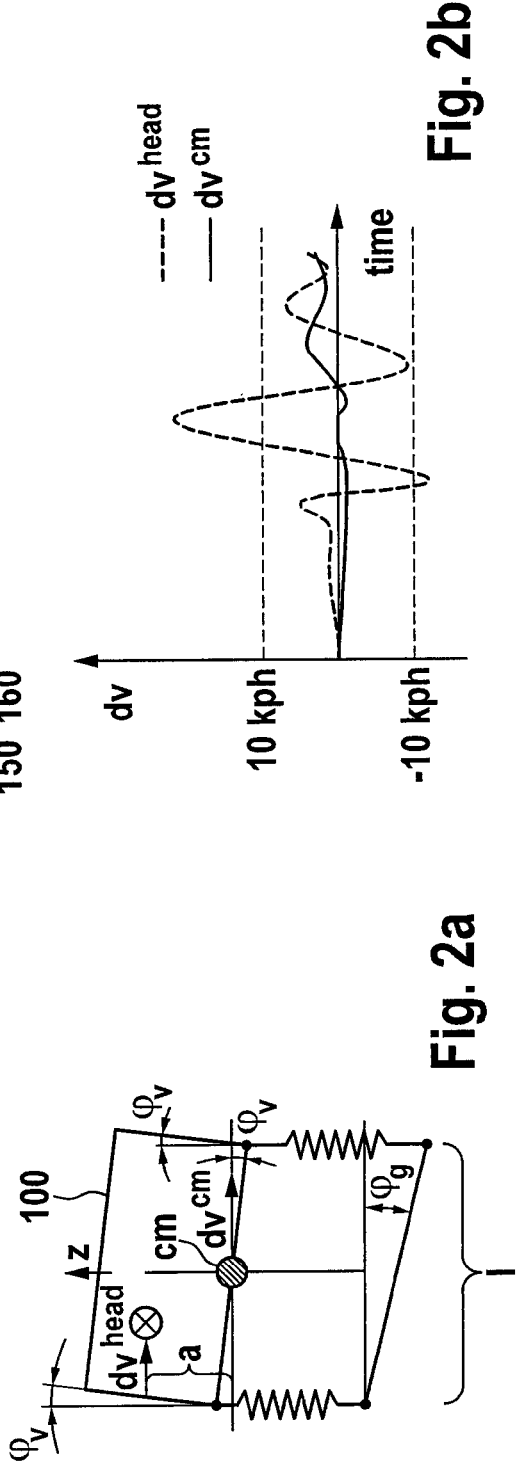
Fig. 2a
Fig. 2b

METHOD AND CONTROL DEVICE FOR THE ACTIVATION OF A PASSENGER SAFETY ARRANGEMENT OF A VEHICLE

CROSS-REFERENCE TO RELATED APPLICATIONS

This application is a continuation of U.S. patent application Ser. No. 13/151,936, filed on Jun. 2, 2011 now abandoned, which claims priority to and the benefit of European patent application no. 10 165 318.6, which was filed in Europe on Jun. 9, 2010, disclosure of which is incorporated herein by reference all of which are hereby incorporated by reference in their entirety.

FIELD OF THE INVENTION

The present invention relates to a method of activating passenger safety arrangement of a vehicle, an apparatus for activating passenger safety arrangement of a vehicle as well as a computer program product according to the description herein.

BACKGROUND INFORMATION

Prior art of the activation of pyrotechnic restraint arrangement in a vehicle is defined by the detection of a high impulse transfer to the passenger cell as a result of a collision with another traffic participant, a moving or a stationary obstacle. Depending on the restraint arrangement used, the time-optimized activation thereof may serve to gently reduce the movements of the occupants relative to the passenger cell resulting from the impulse transfer and therefore minimize the risk of injury.

In principle, a differentiation may be made between time-critical and time-uncritical restraint arrangements. While conventional front and side airbags may only offer protection for a very limited time after activation thereof, restraint such as pyrotechnic belt tighteners and cold curtain airbags may present a protective effect for a considerably longer period of time, even up to several minutes as the case may be.

In addition, reversible protective mechanisms such as e.g. electromotive belt retractors may be incorporated into the integrated protective mechanism in spite of their relatively lengthy activation times.

SUMMARY OF THE INVENTION

On this background, the exemplary embodiments and/or exemplary methods of the present invention serves to present a method as well as a control device employing this method and finally a respective computer program product according to the independent claims. Advantageous embodiments result from the respective dependent claims and the subsequent description.

The exemplary embodiments and/or exemplary methods of the present invention is based on the finding that it has been recognized that complex crash scenarios are conditional on a chronological chain of so-called "dangerous events". One substantial element of such "dangerous events" is driving on extremely uneven terrain exhibiting several obstacles. Typical obstacles may e.g. be presented by fixed edge markings, drainage ditches and rocks.

The danger in driving on extremely uneven terrain lies in the fact that, due to high roll speeds of the vehicle body remotely from the center of rotation, high collision speeds may occur between the passenger and the passenger cell, while, in proximity of the center of rotation, the load applied to the occupants is regarded minor due to smaller accelerations. During a drive on extremely uneven terrain, the probability of the angle of rotation being in the region of the vehicle's center of gravity and therefore the region of the central acceleration sensors of the airbag control device is very high. The peripheral acceleration sensors are usually oriented such in the vehicle that a fast roll acceleration will not generate any high signals in these sensors.

One important aspect of the exemplary embodiments and/or exemplary methods of the present invention lies in the fact that the roll acceleration of the vehicle body is explicitly incorporated into the evaluation of the probability of injury in a type of accident with major field relevance. The advantage of the exemplary embodiments and/or exemplary methods of the present invention may be acknowledged in the fact that, contrary to the conventional way of addressing the singular load on the occupants in a simple vehicle collision, what is evaluated is a persistent load during an uncontrollable terrain drive with respect to the adaptive activation of an appropriate restraint arrangement.

The exemplary embodiments and/or exemplary methods of the present invention provides a method of activating a passenger safety arrangement of a vehicle, the method comprising:
  reading in a roll rate of the vehicle; and
  triggering a passenger safety arrangement when, at a first time, at least one roll rate value is present, which exhibits a positive sign and is larger than a roll rate positive threshold value and when, at a second time after the first time, at least one roll rate value is present, which exhibits a negative sign and is smaller than a roll rate negative threshold value.

Furthermore, the exemplary embodiments and/or exemplary methods of the present invention provides an apparatus for activating a passenger safety arrangement of a vehicle, the apparatus comprising:
  a unit for reading in a roll rate;
  a unit for triggering the passenger safety arrangement when, at a first time, at least one roll rate value is present, which exhibits a positive sign and is larger than a roll rate positive threshold value and when, at a second time after the first time, at least one roll rate value is present, which exhibits a negative sign and is smaller than a roll rate negative threshold value.

The exemplary embodiments and/or exemplary methods of the present invention further provides a control device configured to perform and/or implement the steps of the inventive method. Specifically, the control device may comprise units each configured to execute one step of the method. This embodiment of the present invention in the form of a control device may also serve to achieve the object underlying the present invention in a fast and efficient manner.

At hand, a control device may be an electric device, which processes sensor signals and, in dependence thereon, outputs control signals. The control device may comprise an interface, which may be configured in hardware and/or in software. In the case of a configuration in hardware, the interfaces may, for example, be part of a so-called system ASIC, which comprises diverse functions of the control device. However, it is also possible that the interfaces be individual, integrated circuits or at least partially consist of discrete components. In the case of a configuration in software, the interfaces may be software modules, which may be provided on a microcontroller next to other software modules, for example.

What is also advantageous is the use of a computer program product with a program code for performing the method according to one of the above mentioned embodiments when the program is executed on a control device. Specifically, the computer program may be stored on a machine-readable carrier such as a semi-conductor memory, a hard disk or an optical memory.

The exemplary embodiments and/or exemplary methods of the present invention is advantageous in that, by the evaluation of the roll rate and using signals that are in most cases already present in vehicles, a safety-relevant driving situation may be easily recognized. In particular, a rough terrain drive may be recognized when roll rate values for the vehicle exhibiting high amplitudes with changing signs are occurring, which strongly hints to a major rocking of the vehicle, which should lead to a triggering or activation of a passenger safety arrangement in the vehicle. Specifically, a passenger safety arrangement protecting an occupant's head from an impact on lateral vehicle structures such as the vehicle door or the B-pillar may be activated or triggered. In this way, the use of a signal on the roll rate mostly already present in modern vehicles may be additionally useful for the provision of vehicle safety. The roll rate may e.g. also be obtained by differentiation from a roll angle signal or by integration from a signal on the roll acceleration of the vehicle if such a signal is present in the vehicle instead of a signal on the roll rate. The evaluation or conversion of the present signals for triggering the passenger safety arrangement may be very easily implemented by modern processors. The course of action for the activation of the passenger safety arrangement proposed here may therefore be effected in the processors already incorporated in the vehicle and therefore does not require any additional cost-intensive hardware.

What is especially advantageous is when, in the step of triggering the passenger safety arrangement, a change of values of the roll rate is present, which lasts at least for a predefined time span. The predefined time span may be for example 0.5 seconds. Such an embodiment of the present invention offers the advantage that it may be verified whether it actually is a safety-relevant driving situation of the vehicle what is at hand. This may be effected by the detection of a change of roll rate values executing within the predefined time span. If the change of roll rate values e.g. executes in a very short time span, which is e.g. shorter than the predefined time span, this may be an indication that the vehicle has returned to a safe driving condition so that a triggering of the passenger safety arrangement is no longer necessary.

According to another embodiment of the present invention, the steps of the method may be executed repeatedly in a consecutive manner, specifically at least twice in a consecutive manner. This embodiment of the present invention provides the advantage that, hereby, a further verification of the unsafe driving condition of the vehicle is possible, whereby unnecessary and repair-cost-intensive triggering of the passenger safety arrangement may be avoided.

What is also of advantage is when, in the step of reading in, a roll angle is additionally read in, the method comprising a step of comparing the roll rate with a roll rate threshold value dependent on the roll rate and, in the step of triggering, the passenger safety arrangement is triggered when the roll rate exceeds the roll rate threshold value dependent on the roll rate. Such an embodiment of the present invention offers the advantage that a flexible evaluation may be made as to when the passenger safety arrangement should be triggered. In particular, a dangerous driving situation does not mandatorily have to be dependent on a uniform roll rate threshold value. Rather, this roll rate threshold value should enable a flexible triggering of the passenger safety arrangement.

Also, according to another embodiment of the present invention, in the step of comparing, a roll rate threshold value may be used, which exhibits a lower value at a larger roll angle than at a smaller roll angle, specifically, wherein the roll rate threshold value exhibits a hyperbolic shape. Such an embodiment of the present invention provides the benefit that, in the case of larger roll rate values, the triggering of the passenger safety arrangement is effected already in the range of smaller angles as in this case, the large roll rate is a strong indication of the presence of a safety-relevant driving situation. In the case of a smaller roll rate, the passenger safety arrangement does not have to be triggered until larger roll angles occur. In this way, the above-mentioned embodiment may serve to advantageously adjust a very precise triggering strategy for the passenger safety arrangement.

In order to ensure that the passenger safety arrangement is not triggered by vehicle vibrations during the vehicle's drive, in the step of triggering, the passenger safety arrangement may not be triggered until a read-in roll rate is larger than a predefined absolute roll rate value.

A very advantageous way of utilizing the intervention is, in the step of triggering, triggering or activating passenger safety arrangement, which protects an occupant's head from an impact on a lateral vehicle structure. This embodiment of the present invention provides the advantage that the above-described concept is specifically suitable for avoiding or at least mitigating an impact of the head on a lateral vehicle structure. In this way, the concept presented may contribute to be avoidance of the most frequent types of injuries in accidents.

In order to ensure that the passenger safety arrangement is triggered in the case of actual safety-relevant driving situations only, furthermore, a step of verifying a triggering of the passenger safety arrangement may be provided, wherein the triggering of the passenger safety arrangement is verified when the yaw rate or a quantity derived therefrom is larger than a yaw threshold value and/or when an acceleration in a vertical or lateral driving direction is larger than an acceleration threshold value. This possibility, in turn, may lead to reduced repair costs and a conservation of the passenger safety arrangement for more severe collisions, which may occur shortly afterwards and in which the respective safety arrangement may be needed more urgently.

The exemplary embodiments and/or exemplary methods of the present invention are described in further detail by the accompanying drawings.

BRIEF DESCRIPTION OF THE DRAWINGS

FIG. 1 shows a block diagram of a schematic utilization scenario of a first embodiment of the present invention in the form of an apparatus.

FIG. 2a shows a vehicle model for the illustration of a movement of the head of a vehicle's occupant in a roll movement of the vehicle.

FIG. 2b shows a diagram of different speeds of the occupant's head relative to the vehicle's center of gravity.

DETAILED DESCRIPTION

Figure 3:
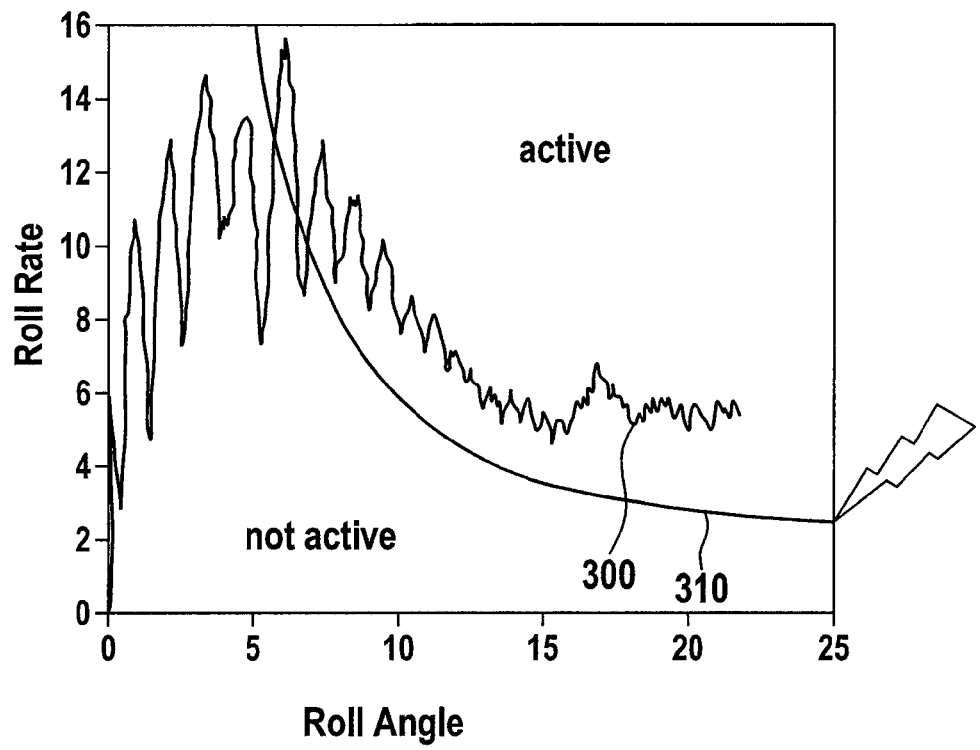
FIG. 3 shows a diagram of a roll-angle dependent threshold value for the detection of a safety-relevant driving situation.

In the figures below, like or similar elements may be provided with like or similar reference numbers, with a repeated description being dispensed with. In addition, the Figures of the drawings, the description thereof as well as the claims include numerous features in combination. A person skilled in the art clearly understands that these features may also be regarded individually or that they may be combined to form further combinations that are not explicitly described herein. Furthermore, the exemplary embodiments and/or exemplary methods of the present invention may in the following description be discussed using different measures and dimensions, whereby stating these measures and dimensions is not to be understood such that the present invention is limited to these measures and dimensions. Furthermore, inventive method steps may also be executed repeatedly or in an order other than described. If an embodiment includes an "and/or" connection between a first feature/step and a second feature/step, this may be interpreted such that the embodiment may, according to one form, comprise both the first feature/the first step and the second feature/the second step and, according to another form, comprise the first feature/the first step only or the second feature/the second step only.

In order to provide especially good protection for vehicle occupants, special focus should be put on possible head injuries of vehicle occupants. This type of injury represents a major type of severe accident injuries so that an avoidance of head injuries or at least a reduction of the severity of head injuries represents a substantial improvement of passenger safety. In this context, it is to be considered that head injuries are often caused by a roll movement of the vehicle, in which the occupant's head is catapulted against the B-pillar of the vehicle or another lateral vehicle part such as the window. If respective passenger restraint arrangement is activated in this case, such a severe head injury caused by the impact of the head on a lateral vehicle part may be avoided.

In order to activate a respective restraint arrangement, a sensor and evaluation system may be used in the vehicle as it is exemplarily illustrated in the block diagram according to FIG. 1. Here, in a vehicle 100, a first sensor 110 is arranged, which may e.g. detect a roll movement on a vehicle longitudinal axis 120. A signal reflecting information on the roll movement may be fed to an evaluation unit 130 and there be processed according to the evaluation algorithm described in a more detailed manner in the following. The information on the roll movement may be a current roll angle or a time-dependent course of a roll angle, a roll rate or a roll acceleration and is processed respectively in the evaluation unit 130. If, by the use of the information on the roll movement, it is detected that a safety-relevant driving situation of the vehicle 100 is present, the activation or triggering of a passenger safety arrangement such as e.g. a front airbag 140 or a side airbag 150 is performed by the evaluation unit 130. As a result, the occupant 160, specifically the occupant's 160 head, may be very effectively protected from injuries, or the severity of respective head injuries may be reduced. In order to avoid faulty triggering of the passenger safety arrangement, a verification of the safety-relevant driving situation of the vehicle 100 may be performed. For this purpose, for example, a signal of a further sensor 170, which is available at the evaluation unit 130, may be used. The further sensor 170 may e.g. provide information on a yaw movement, that is, a movement of the vehicle 100 on a vertical vehicle axis. The information on the yaw movement may be a yaw angle, a yaw rate or a yaw acceleration, for example. Alternatively or additionally, the second sensor 170 may also supply to the evaluation unit 130 information on an acceleration of the vehicle 100 in a lateral direction, that is, in a direction transverse to a driving direction 180 of the vehicle 100, or in a vertical direction. The evaluation unit 130 may also use this information for the verification of the safety-relevant driving situation of the vehicle 100.

The question which restraint arrangement to activate in the case of a crash depends on the type and severity of the crash. As a rule, in the case of a crash, time-critical and time-uncritical restraint arrangement are activated by the triggering functions of the electronic safety system within a very small time slot. In a multitude of simple crash scenarios, temporal coupling of the activation of time-critical and time-uncritical restraint arrangement is sensible, however not mandatory. For example, it may be the case that, in a drive on rough terrain after leaving the road, a multitude of minor collisions may occur, wherein, regarding each collision by itself, the activation of irreversible restraint arrangement is not necessary, whereas the chronological chain of several minor collisions may definitely require the activation of time-uncritical restraint arrangement. Early activation of the irreversible belt tightener, for example, may also, prior to a significant vehicle collision, serve to avoid a movement of occupants relative to the passenger cell, as such movement may, on the one hand, highly impair a protective effect of the time-critical restraint arrangement and, on the other hand, by itself result in injuries.

One important aspect of the exemplary embodiments and/or exemplary methods of the present invention is the early activation of time-uncritical restraint arrangement in dangerous driving situations, which, in complex crash developments, may be at a significantly earlier point in time than the actual vehicle collision, in which the time-critical restraint arrangement are to be activated.

One important element in a typical dangerous driving situation, the "run-off-road", is a significant rocking motion of the vehicle body on rough terrain. For example, despite little lateral acceleration of the vehicle's center of gravity, a strong roll movement of the passenger cell may result in high relative speeds of the passenger cell and the occupants' heads.

As the schematic representation in FIG. 2 shows, the rocking motion of the vehicle body in a drive on rough terrain may cause a very large load on the car occupant in the vehicle's center of gravity. In this context, FIG. 2a shows a schematic diagram of a vehicle as a spring model, in which the two absorbers on the two vehicle sides opposite each other at a distance I are represented by springs. The black dot designated with cm represents the vehicle's center of gravity. The drive on uneven terrain effects a rocking motion of the vehicle, which results in a roll angle $\phi_v$ of the vehicle body as opposed to a larger angle $\phi_g$ of the chassis. The vehicle occupant's head, which is designated in FIG. 2a by a circle comprising a cross, is located at a distance a above the center of gravity cm. As the vehicle moves in the center of gravity cm at the difference speed $dv^{cm}$, the difference speed $dv^{head}$ acts on the head, according to a correlation that will be described in further detail in the following. In FIG. 2b, a diagram illustrating the difference speeds $dv^{cm}$ and $dv^{head}$ in a drive through very rough terrain is represented versus the time.

The early safe detection of a "critical rotatory rough terrain drive" enables, in combination of other driving situation elements, the early activation of time-uncritical restraint arrangement in dangerous situations. This serves to ensure that the occupants are fixed in a position usable for time-critical restraint arrangement in time so that injuries due to the occupants colliding with the passenger cell may be reduced. Thus, basic protection is guaranteed for protracted, complex occupant movements, in which time-critical, one-time effective safety systems may not unfold their full protective effect. The exemplary embodiments and/or exemplary methods of the present invention serves to ensure that in the temporal course of the vehicle movement following, any noteworthy danger of injury to the occupants may be safely detected, whereby the early activation of irreversible restraint arrangement is also made possible.

The safe classification of a drive on very uneven ground requires the selection of characteristic features. The list of characteristic features for the detection of slopes includes, amongst others:
- roll acceleration
- roll rate
- roll angle
- yaw acceleration
- yaw rate
- slip angle
- lateral acceleration (AccY)
- longitudinal acceleration (AccX)
- vertical acceleration (AccZ)
- speeds of the individual wheels
- breaking and driving torques at the individual wheels
- steering angle
- pitch acceleration
- pitch rate The safe classification of a drive on the very uneven terrain may include a selection of the features mentioned as well as the entire list of features. Favorably, the individual features are suitably grouped for the representation of the essential elements of a "drive on very uneven terrain".

The classification method of a "drive on very uneven terrain" as a whole includes three elements:
1. Start and reset criterion for the detection of a "drive on very uneven terrain"
2. Detection of a driving condition bearing a high risk of injury
3. Signal-independent plausibilization of the driving condition detection First, the first start and reset criterion on for the detection of a "drive on very uneven terrain" is observed more closely. The roll rate and the roll angle represent suitable features for a start and reset criterion. According to the representation in FIG. 3, a "vehicle movement on very uneven terrain" either exhibits large roll angles or large roll rates, which are usually not observed in a controlled drive on rough terrain. On the abscissa of the diagram in FIG. 3, there is plotted the roll angle, whereas, on the ordinate of the diagram of FIG. 3, there is plotted the roll rate. If, in dependence of the currently estimated roll angle, the roll rate 300 of the vehicle body exceeds a critical value, which may be regarded as a roll rate threshold value 310 dependent on the currently estimated roll angle, high, injury-relevant vehicle dynamics may be assumed, which basically justify the evaluation of the vehicle condition regarding the activation of restraint arrangement.

If these injury-relevant driving dynamics are detected, the evaluation of the driving condition regarding the activation of restraint arrangement is started. In this case, there may be effected, possibly under consideration of further signals, a triggering or activation of passenger safety arrangement such as e.g. the belt tightener, the front airbags or the side airbags. Favorably, numerical values may be selected for the threshold value graph, which also mark a rollover-critical driving condition. In this way, the approach described herein may also serve for a detection of a rollover.

Figure 4:
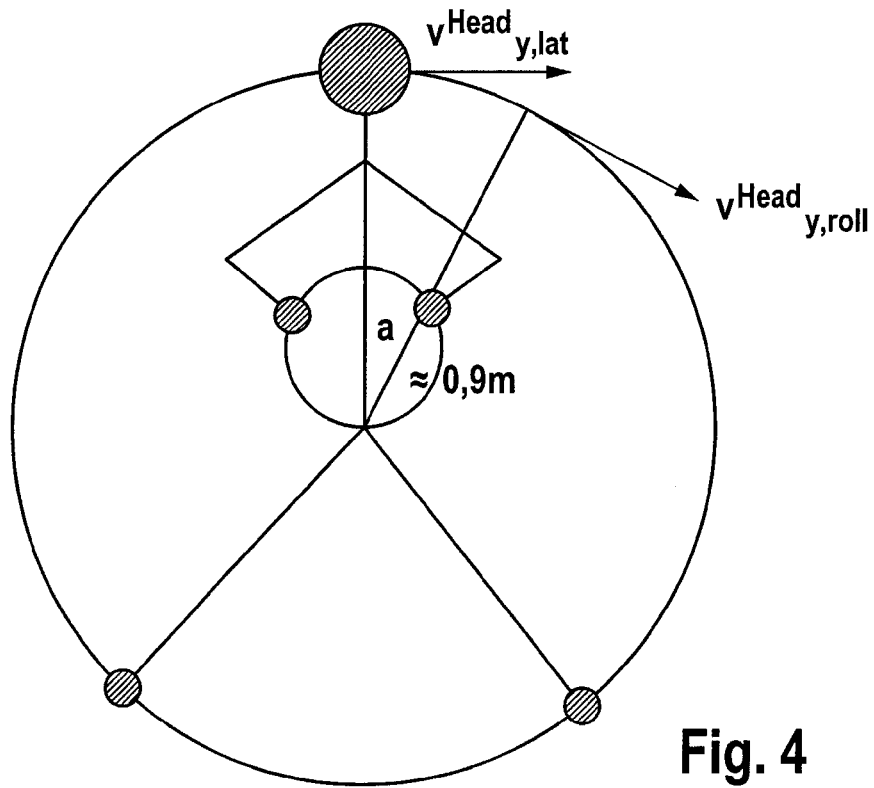
FIG. 4 shows a diagram illustrating the derivation of a correlation between the roll rate and a speed of the car occupant's head.

Furthermore, in a second aspect of the approach presented here, a detection of a driving condition bearing a high risk of injury may be effected. The driving condition bearing a high risk of injury is detected by the roll acceleration of the head on hitting a window. The head speed may be derived or reasoned using the representation of FIG. 4:

The lateral head movement $v^{Head}$ is dependent on the roll rate and the angle with the vehicle structure:

$$v^{head}_{y,lat} = \omega_x * (\text{distance "head–body center of gravity"}) * \cos(\text{angle "upper body relative to vehicle vertical"})$$

Assuming that the distance "head–body center of gravity" is approximately 0.9 m and the angle α "upper body relative to vehicle vertical" is negligibly small when the head impacts on the window—therefore cos (α)=1 and/or $v^{head}_{y,lat} \approx v^{head}_{y,roll}$—the following approximation formula results for the lateral and/or roll head movement:

$$v^{head}_{y,lat} \approx v^{head}_{y,roll} \approx \omega_x * 0.9 \text{ m}$$

Therefore, the roll rate may be directly drawn upon for the detection of a high speed of the head when impacting on the window. The gradient and the amplitude may serve to establish the severity of the vehicle situation regarding the occupant:

In order to ensure a triggering of the airbags, the amplitudes should be exceptionally high and exhibit different signs.

Moreover, a dynamic change of the roll rate over a certain period of time, for example 0.5 seconds should be present.

These two conditions should occur twice in a row so as to be able to classify a rocking motion and therefore a critical driving situation as a serious terrain drive. However, for identifying a pre-stage of this serious terrain drive, it may be sufficient to evaluate this condition just once.

Furthermore, an independent plausibilization of the driving condition detection may also be effected in the situation of a rough terrain drive. In a situation of a rough terrain drive, the acceleration signals indicate substantial dynamics, specifically lateral and vertical accelerations. Furthermore, significant amplitudes and dynamics are also detectable in the yaw rate. Using these signals, specifically using appropriate threshold values, a verification or plausibilization of the detected terrain drive on very uneven terrain may be effected. Especially when the respective acceleration signals lie above the assigned threshold values, a situation of such a safety-relevant driving situation may be verified or plausibilized. The signal waveforms of these vertical or lateral accelerations or of the yaw rate occurring are caused by the impacts to vehicle. Therefore, these signal waveforms may drawn upon for a plausibilization by independent sensors.

The discussed detection of a "drive on very uneven terrain" especially requires mainly a roll rate sensor, which could be integrated in the airbag control device or be connected to the control device via a fast data communication. However, the roll rate can also be calculated from a course of roll angles or a roll acceleration value or the like. The function activates restraint arrangement in a predetermined value range of the roll acceleration or the roll rate. By a defined rotary motion of the current-carrying control device, the functionality of the approach presented here may be gauged, and the integrated functionality may be checked.

Figure 5:
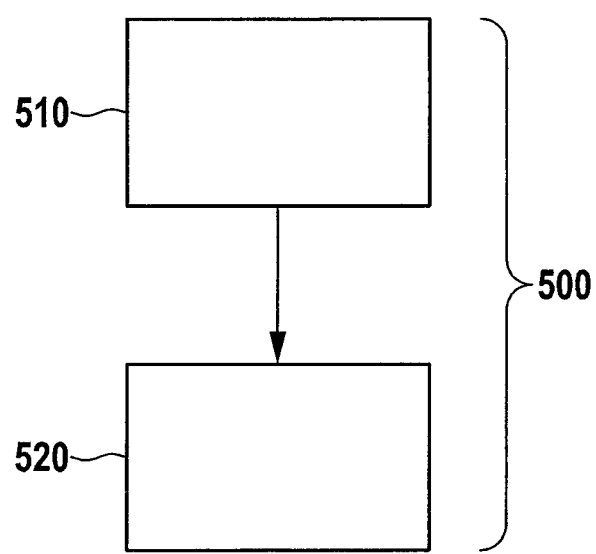
FIG. 5 shows a flow chart of an embodiment of the present invention in the form of a method.

Furthermore, the exemplary embodiments and/or exemplary methods of the present invention provides a method 500 of the activation of passenger safety arrangement of a vehicle, as it is represented in FIG. 5 in the form of a flow chart. The method 500 comprises a step of reading in 510 a roll rate of the vehicle and a subsequent step of triggering 520 the passenger safety arrangement when, at a first time, at least one roll rate value is present, which exhibits a positive sign and is larger than a roll rate positive threshold value and when, at a second time after the first time, at least one roll rate value is present, which exhibits a negative sign and is smaller than a roll rate negative threshold value.

What is claimed is:

1. A method of activating a passenger safety arrangement of a vehicle, the method comprising:
   using a computer processor, reading in a roll rate of the vehicle; and
   using the processor, triggering the passenger safety arrangement only after both a first time period and a second time period have occurred, wherein the first time period occurs when at least one roll rate value is present, which exhibits a positive sign and is larger than a roll rate positive threshold value, and wherein the second time period occurs after the first time period, when at least one roll rate value is present, which exhibits a negative sign and is smaller than a roll rate negative threshold value.

2. The method of claim 1, wherein in addition to the occurrence of both the first time period and the second time period, the triggering of the passenger safety arrangement is effected only when a change of values of the roll rate is present and lasts at least for a predefined time span.

3. The method of claim 1, wherein the reading and the triggering are executed repeatedly at least twice in a consecutive manner.

4. The method of claim 1, further comprising:
   comparing the roll rate with a roll rate threshold value dependent on a roll angle of the vehicle, wherein the triggering of the passenger safety arrangement is conditioned on the roll rate exceeding the roll rate threshold value dependent on the roll angle, and wherein the reading includes reading in the roll angle.

5. The method of claim 4, wherein the roll rate threshold value dependent on the roll angle exhibits a lower value at a larger roll angle than at a smaller roll angle, and wherein the roll rate threshold value dependent on the roll angle exhibits a hyperbolic shape.

6. The method of claim 1, wherein in addition to the occurrence of both the first time period and the second time period, the passenger safety arrangement is triggered only when a read-in roll rate is larger than an absolute roll rate value.

7. The method of claim 1, wherein the passenger safety arrangement is triggered or activated to protect an occupant's head from impacting on a lateral vehicle structure.

8. The method of claim 1, further comprising:
   verifying a triggering of the passenger safety arrangement, wherein the triggering of the passenger safety arrangement is verified at least one of (i) when a yaw rate or a quantity derived therefrom is larger than a yaw threshold value, and (ii) when an acceleration in a vertical or lateral driving direction is larger than an acceleration threshold value.

9. An apparatus for activating a passenger safety arrangement of a vehicle, comprising:
   a reading arrangement to read in a roll rate; and
   a triggering arrangement to trigger the passenger safety arrangement only after both a first time period and a second time period have occurred, wherein the first time period occurs when at least one roll rate value is present, which exhibits a positive sign and is larger than a roll rate positive threshold value, and wherein the second time period occurs after the first time period, when at least one roll rate value is present, which exhibits a negative sign and is smaller than a roll rate negative threshold value.

10. The apparatus of claim 9, wherein in addition to the occurrence of both the first time period and the second time period, the triggering of the passenger safety arrangement is effected only when a change of values of the roll rate is present and lasts at least for a predefined time span.

11. The apparatus of claim 9, wherein the reading and the triggering are executed repeatedly at least twice in a consecutive manner.

12. The apparatus of claim 9, further comprising:
   a comparing arrangement to compare the roll rate with a roll rate threshold value dependent on a roll angle of the vehicle, wherein the triggering of the passenger safety arrangement is conditioned on the roll rate exceeding the roll rate threshold value dependent on the roll angle, and wherein the reading includes reading in the roll angle.

13. The apparatus of claim 12, wherein the roll rate threshold value dependent on the roll angle exhibits a lower value at a larger roll angle than at a smaller roll angle, and wherein the roll rate threshold value dependent on the roll angle exhibits a hyperbolic shape.

14. The apparatus of claim 9, wherein in addition to the occurrence of both the first time period and the second time period, the passenger safety arrangement is triggered only when a read-in roll rate is larger than an absolute roll rate value.

15. The apparatus of claim 9, wherein the passenger safety arrangement is triggered or activated to protect an occupant's head from impacting on a lateral vehicle structure.

16. The apparatus of claim 9, further comprising:
   a verifying arrangement to verify a triggering of the passenger safety arrangement, wherein the triggering of the passenger safety arrangement is verified at least one of (i) when a yaw rate or a quantity derived therefrom is larger than a yaw threshold value, and (ii) when an acceleration in a vertical or lateral driving direction is larger than an acceleration threshold value.

17. A non-transitory computer readable medium having a computer program, which is executable by a processor of a control apparatus, comprising:
   a program code arrangement having program code for activating a passenger safety arrangement of a vehicle by performing the following:
   using the processor, reading in a roll rate of the vehicle; and
   using the processor, triggering the passenger safety arrangement only after both a first time period and a second time period have occurred, wherein the first time period occurs when at least one roll rate value is present, which exhibits a positive sign and is larger than a roll rate positive threshold value, and wherein the second time period occurs after the first time period, when at least one roll rate value is present, which exhibits a negative sign and is smaller than a roll rate negative threshold value.

18. The computer readable medium of claim 17, wherein in addition to the occurrence of both the first time period and the second time period, the triggering of the passenger safety arrangement is effected only when a change of values of the roll rate is present and lasts at least for a predefined time span, and wherein the reading and the triggering are executed repeatedly at least twice in a consecutive manner.

19. The computer readable medium of claim 17, further comprising:
   comparing the roll rate with a roll rate threshold value dependent on a roll angle of the vehicle, wherein the triggering of the passenger safety arrangement is conditioned on the roll rate exceeding the roll rate threshold value dependent on the roll angle, wherein the reading includes reading in the roll angle, and wherein the roll rate threshold value dependent on the roll angle exhibits a lower value at a larger roll angle than at a smaller roll angle, and wherein the roll rate threshold value dependent on the roll angle exhibits a hyperbolic shape.

20. The computer readable medium of claim 17, further comprising:

verifying a triggering of the passenger safety arrangement;

wherein the triggering of the passenger safety arrangement is verified at least one of (i) when a yaw rate or a quantity derived therefrom is larger than a yaw threshold value, and (ii) when an acceleration in a vertical or lateral driving direction is larger than an acceleration threshold value, wherein in addition to the occurrence of both the first time period and the second time the passenger safety arrangement is triggered only when a read-in roll rate is larger than an absolute roll rate value, and wherein the passenger safety arrangement is triggered or activated to protect an occupant's head from impacting on a lateral vehicle structure.

* * * * *